P. J. HAMILL.
WHEEL.
APPLICATION FILED MAY 15, 1918.
1,299,332.
Patented Apr. 1, 1919.
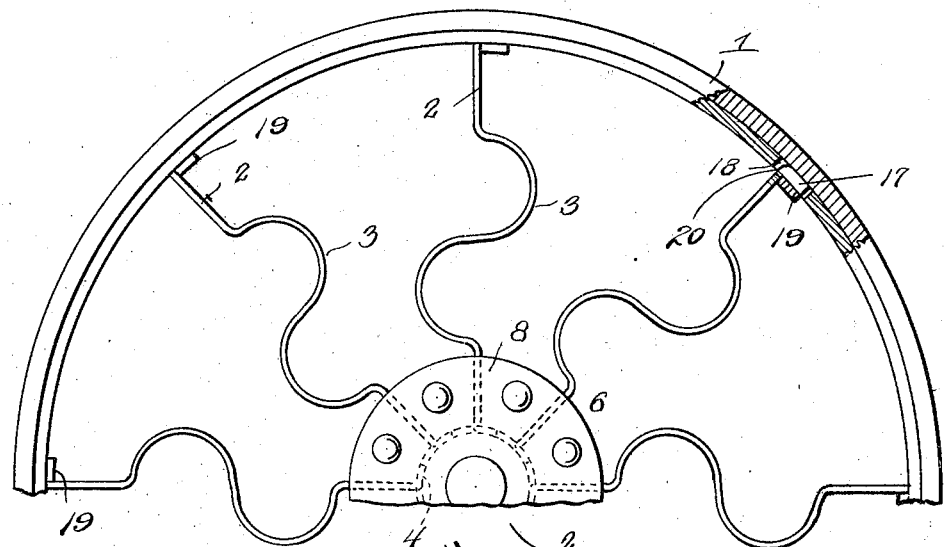
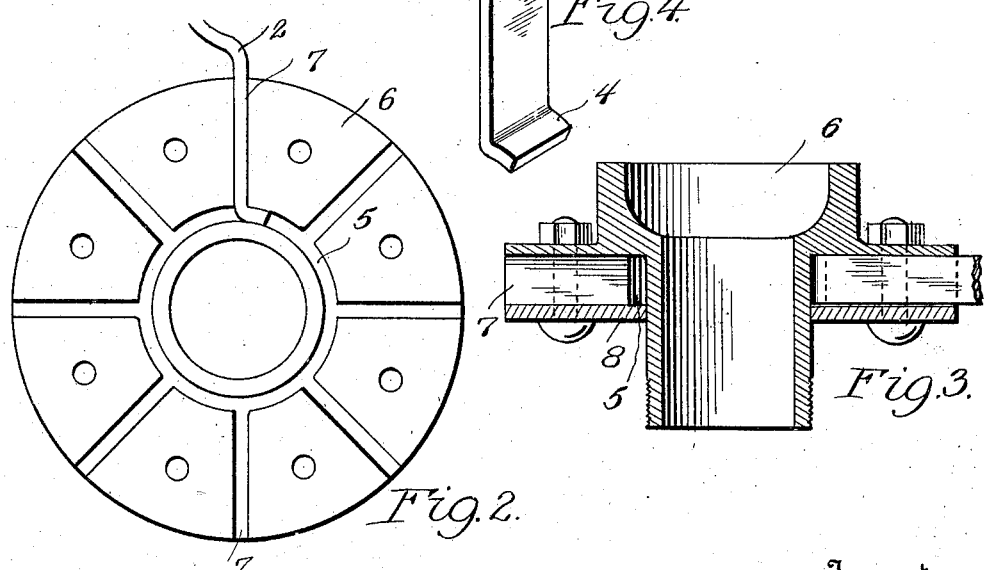
Inventor
Patrick J. Hamill.
Witnesses
By Victor J. Evans
Attorney

UNITED STATES PATENT OFFICE.

PATRICK J. HAMILL, OF BOSWELL, PENNSYLVANIA.

WHEEL.

1,299,332.  Specification of Letters Patent.  Patented Apr. 1, 1919.

Application filed May 15, 1918. Serial No. 234,743.

*To all whom it may concern:*

Be it known that I, PATRICK J. HAMILL, a citizen of the United States, residing at Boswell, in the county of Somerset and State of Pennsylvania, have invented new and useful Improvements in Wheels, of which the following is a specification.

This invention relates to a wheel and has for its primary object to construct a wheel in a manner that the same will have the proper amount of resiliency for the purpose of dispensing with the well known form of pneumatic tire.

An object of the invention is to provide a wheel in which all the resilient elements will be performing work at all times irrespective of the relative positions of the resilient elements.

Another object of the invention is to provide an inexpensive resilient wheel of substantial construction in which the parts are so associated that any element thereof may be readily removed for renewal, an important feature being the means for connecting the spokes with the felly.

With these and other objects in view the invention will be better understood from the following detailed description taken in connection with the accompanying drawings wherein:

Figure 1 is a side elevation of a portion of the wheel constructed in accordance with my invention, parts being broken away and in section.

Fig. 2 is a side elevation of the hub showing the plate removed.

Fig. 3 is a horizontal sectional view through the hub and plate.

Fig. 4 is a perspective view of the inner end of the spokes.

Again referring to the drawings my invention consists of a felly 1 of the usual construction to support a solid tire or if found advantageous in practice the rim 1 may be formed solid and run direct upon the ground without the use of a tire. The felly 1 is secured to the outer end of a plurality of spokes 2 each as shown in Fig. 1 consisting of a strip of spring steel bowed in opposite directions as indicated at 3, so as to expand and contract in proportion to the movement of the felly toward and away from the hub of the wheel. A very important feature in constructing the spokes as shown is that all of the spokes are subject to the movement of the felly thereby giving the wheel the proper amount of resiliency in the most substantial manner possible.

As shown in Fig. 4 the inner end portion of each spoke extends radially of the wheel and is provided with an offset 4 adapted to be arranged in the groove 5 formed in the hub 6 while the radial portion of the spoke is snugly received in the slot 7 of the hub that communicates with the groove 5. Thus it will be seen that when the inner end of the spoke is arranged in place within the slot 7 and groove 5 the same will effectively be held against being displaced by movement of the felly in a radial direction, in which direction all excessive strains take place in the use of the wheel. This construction also allows the felly and spoke to be quickly removed from the hub by moving the same laterally thus allowing repairs to be quickly made without the necessity of removing the hub from its axle. For the purpose of preventing accidental removal of the spokes from the hub I provide a plate 8 bolted to the hub and engaging an edge of each spoke. It is of course to be understood that the construction of the hub and the associated plate therewith may be constructed in various other manners than that shown for supporting the inner end of the spokes. Therefore I do not desire to be limited in any manner except as set forth in the claim.

In order to connect the spokes with the felly, the outer end of each spoke is reduced and bent right angularly to form a hook 17 extending circumferentially of the felly. The reduced end portion defines shoulders 20 on the spoke. The felly is provided with lugs 19 stamped therefrom and bent inwardly. The lugs extend transversely of the felly and leave openings 18 therein. The hook 17 of the spoke is passed through the opening 18 and engaged behind the lug 19, with the shoulders 20 engaging the inner periphery of the felly at the ends of the opening 18. Displacement of the ends of the spokes is consequently prevented.

It is of course to be understood that my invention may be constructed in various other ways than that shown and slight mechanical changes may be made in certain parts and therefore I do not desire to be limited to the exact showing except as set forth in the appended claim.

Having described my invention, what I claim is:

In a wheel comprising a hub, a felly, and resilient spokes, means for connecting the outer ends of said spokes with the felly comprising a right angularly bent portion on the outer end of each spoke extending circumferentially of the felly, and a lug stamped from the felly and extending inwardly thereof in lateral relation thereto, said angular portion of the spoke engaging behind said lug whereby outward movement of the felly with respect to the spoke will be prevented, and said spoke being provided adjacent said angular portion with shoulders abuttingly engaging the inner periphery of the felly at the sides of the opening left by the lug whereby inward movement of the felly with respect to the spoke will be prevented.

In testimony whereof I affix my signature.

PATRICK J. HAMILL.

Copies of this patent may be obtained for five cents each, by addressing the "Commissioner of Patents, Washington, D. C."